(12) United States Patent
Ebel et al.

(10) Patent No.: US 10,891,631 B2
(45) Date of Patent: Jan. 12, 2021

(54) FRAMEWORK FOR GENERATING RISK EVALUATION MODELS

(71) Applicant: PAYPAL, INC., San Jose, CA (US)

(72) Inventors: Lior Ebel, Modiin (IL); Shir Fiszman, Givatayim (IL)

(73) Assignee: PayPal, Inc., San Jose, CA (US)

( * ) Notice: Subject to any disclaimer, the term of this patent is extended or adjusted under 35 U.S.C. 154(b) by 87 days.

(21) Appl. No.: 16/215,240

(22) Filed: Dec. 10, 2018

(65) Prior Publication Data

US 2020/0184488 A1    Jun. 11, 2020

(51) Int. Cl.
*G06Q 30/00* (2012.01)
*G06F 9/54* (2006.01)
*G06F 16/27* (2019.01)
*G06N 20/00* (2019.01)

(52) U.S. Cl.
CPC ......... *G06Q 30/0185* (2013.01); *G06F 9/547* (2013.01); *G06F 16/27* (2019.01); *G06N 20/00* (2019.01)

(58) Field of Classification Search
CPC .................................................. G06Q 30/0185
See application file for complete search history.

(56) References Cited

U.S. PATENT DOCUMENTS 9,092,828 B2 *   7/2015  Hosp ...................... G06Q 20/02
2012/0259894 A1* 10/2012  Varley .................... G06F 16/93
                                                              707/795
2014/0095353 A1   4/2014  Psota et al.
2014/0200930 A1*  7/2014  Zizzamia ............... G06Q 40/08
                                                              705/4
2014/0351048 A1  11/2014  Fordyce et al.
2015/0220945 A1*  8/2015  Iannace .............. G06Q 30/0202
                                                              705/7.31
2015/0348039 A1  12/2015  Allen et al.
2016/0104163 A1*  4/2016  Aquino .................. G06Q 40/12
                                                              705/44
2016/0112394 A1*  4/2016  Sahu ..................... H04L 63/102
                                                              726/7
2016/0171065 A1*  6/2016  Kumar .................. G06F 16/258
                                                              707/756
2017/0270529 A1   9/2017  Ebel et al.

(Continued)

FOREIGN PATENT DOCUMENTS

AU       2014201516        10/2014
FR          3048840         9/2017

*Primary Examiner* — Scott C Anderson
(74) *Attorney, Agent, or Firm* — Haynes and Boone LLP (57) ABSTRACT

Methods and systems are presented for providing a framework to generate computer models for detecting fraudulent electronic transactions. The framework selects and retrieves a set of transaction records from an online database system based on one or more criteria. The framework then enriches the set of transaction records with additional data related to the set of transaction records. The additional data of each transaction record may include transaction data of another transaction record selected based on a common attribute shared with the transaction record. The framework serializes the transaction data and the additional data associated with the set of transaction records. A set of features is derived based on analyzing the serialized data. The framework then generates a computer model for detecting fraudulent electronic transaction based on the set of features.

20 Claims, 7 Drawing Sheets

(56) References Cited

U.S. PATENT DOCUMENTS

| | | | |
|---|---|---|---|
| 2017/0287021 A1* | 10/2017 | Gilbertson | G06Q 30/06 |
| 2018/0144153 A1* | 5/2018 | Pead | G06F 21/6245 |
| 2018/0268410 A1* | 9/2018 | Kolotinsky | G06F 21/316 |
| 2019/0236598 A1* | 8/2019 | Padmanabhan | G06Q 20/4016 |

* cited by examiner

FRAMEWORK FOR GENERATING RISK EVALUATION MODELS

BACKGROUND

The present specification generally relates to risk evaluation modeling, and more specifically to, frameworks for generating computer models used in evaluating electronic transactions.

RELATED ART

Tactics in performing fraudulent transactions electronically are ever-evolving and becoming more sophisticated. Electronic service providers need to keep pace with the fraudulent users in providing security measures, such as accurately evaluating risk (e.g., detecting fraud transactions) in real-time. In this regard, computer models are often utilized to assist in evaluating risks of electronic transactions in real-time. The computer models ingest data related to the transaction, perform analyses on the ingested data, and provide an outcome. A decision of whether to authorize or deny the transaction may then be made based on the outcome.

As mentioned above, fraudulent transaction tactics are dynamic and may change from time to time. For example, old tactics that were not used recently may reemerge as a new trend, new tactics may be introduced, and tactics may reemerge periodically as a seasonal trend. To add to the complication, the user population of the services may also change from time to time. For example, the services may be introduced to a new geographical region, which exhibits different fraudulent behavior than the existing user population. As a result, computer models that focus on maximizing performance based on recent fraudulent transaction data may underperform (e.g., fail to identify fraudulent transactions) in the future. Electronic service providers may have to generate new computer models (e.g., by using different features) from time to time to target new tactics and new fraud trends. However, constantly generating new computer models for evaluating risks in electronic transactions can be costly. Thus, there is a need for systems and methods that efficiently generate robust computer models for evaluating risks in electronic transactions.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a framework for generating a computer model (e.g., a risk analysis model) in evaluating risks in electronic transactions for an electronic service provider. A computer model generated for evaluating risks in electronic transactions may use a set of data (also referred to as "features") related to an electronic transaction to assess a risk (e.g., generating a risk score) of an electronic transaction. The risk score may indicate whether the electronic transaction is a possible, potential, or likely fraudulent transaction. The set of features used to assess the risk of the electronic transaction may include various information related to or derived from the electronic transaction, such as a transaction type, a transaction amount, a user account associated with the transaction, a browser type of a browser used to initiate the transaction, a device type of a device used to initiate the transaction, an Internet Protocol (IP) address of the device used to initiate the transaction, a difference between the transaction amount of the electronic transaction and an average transaction amount in previous transactions that involve the payor in the electronic transaction, a difference between the transaction amount of the electronic transaction and an average transaction amount in previous transactions that involve the payee in the electronic transaction, an average transaction frequency of the payor in the past, an average transaction frequency of the payee in the past, and other information related to and/or derived from the electronic transaction. Some of the features may be more relevant (or more indicative) for evaluating risks of electronic transactions than others. As such, generating a computer model involves determining which of the available candidate features should be used in evaluating risks of electronic transactions and possibly determining the weights of the selected candidate features.

Conventionally, to build a new computer model, a model builder (e.g., a data scientist) of the electronic service provider may test one or more candidate features based on available training data to determine the respective relevancy of the candidate features in evaluating risks of electronic transactions. The training data may comprise offline transaction data that is stored in a database system. Upon selecting a set of candidate features, the computer model may be trained using the available training data stored in the database system. When the computer model is ready, a software developer of the electronic service provider may implement the computer model in an online environment where the computer model is used to evaluate electronic transaction requests in real-time.

Building the computer model under such an approach can be costly in terms of time and computer processing. One of the causes can be attributed to the fact that accessing the transaction data from the database system is slow (e.g., as opposed to accessing data in memory). The time to access the transaction data may be further affected because some of the features may require accessing transaction data from different records, different tables, and/or different databases. An example feature is one that corresponds to a difference between the transaction amount of the electronic transaction and an average transaction amount in previous transactions that involve the payor in the electronic transaction. A first query is submitted to the database system to access a record associated with the electronic transaction. From the record, a transaction amount of the electronic transaction is determined, and a payor of the electronic transaction is identified. Based on the identified payor, a second query is submitted to the database to access records associated with past electronic transactions that involve the payor. An average transaction amount may then be calculated based on the transaction data associated with the records retrieved using the second query. As illustrated, multiple (e.g., potentially tens or hundreds) of different records are accessed from the database system to compute a value of the feature associated with one electronic transaction. Since potentially hundreds or thousands of electronic transactions are used to test a particular feature, the time used for testing the feature can be substantial.

Second, the transaction data from the offline database may be different from the transaction data from an online database (e.g., the offline database may store records that are outdated, such as 6 months old, etc.). Thus, the training data may not reflect the characteristics of a current trend of fraudulent electronic transactions, and the features selected by the data scientist may not be optimal as a result. Furthermore, since the testing of the computer model may be performed in an environment that is different from the online environment where the computer model will be used in evaluating live electronic transactions, the computer model that is implemented by the data scientists for testing may have to be implemented differently (e.g., rewriting the source code by a software developer) according to the online environment. As a result, the implementation of the computer model by the software developer may not accurately capture every aspect of the computer model contemplated by the data scientist. As such, the computer model may have to be revised multiple times before the computer model can be used in the online environment.

Thus, in some aspects of the disclosure, a framework is provided to enable efficient selecting, adjusting, and evaluating of candidate features based on online transaction data and implementation of a computer model for evaluating risks of electronic transactions. In some embodiments, the framework may provide an interface that enables a user (e.g., a data scientist of the electronic service provider) to select transaction records from an online database as training data for developing a new computer model. For example, the interface may enable the user to select one or more criteria (e.g., transaction types such as electronic payment transactions, log-in transactions, onboarding transactions, adding funding source transactions, etc.) for selecting the records from the online database system. Once the criteria are obtained, the framework may retrieve transaction records (e.g., by submitting queries) from the online database system.

The framework may further enrich the transaction records by obtaining additional data that is associated with the retrieved transaction records from the online database system. The additional data may include data that is needed for deriving one or more features for the transaction record and may comprise transaction data from another transaction record. For example, for each selected transaction record, the framework may retrieve transaction data (e.g., transaction amounts, transaction dates, etc.) of other related transaction records (e.g., other transaction records having the same payor and/or payee as the selected transaction record, other transaction records originated from devices having the same IP address as the selected transaction record, etc.).

In some embodiments, the framework may serialize (e.g., flatten) the enriched transaction records. For example, the transaction data of the transaction records may be stored according to a particular data structure (e.g., a hierarchy of tables, inter-linked data objects, etc.) in the online database system. As such, the framework may serialize the transaction data from each transaction record by extracting the transaction data from the particular data structure and serializing the transaction data into a string of characters (e.g., a text format), where each piece of transaction data may be separated by another piece of transaction data using a special character (e.g., a comma, etc.). In some embodiments, the serialized transaction data may be stored in a data file (e.g., a text file) such that the transaction data of each transaction record may occupy a single row (e.g., a single line) in the data file. The additional data associated with a transaction record may be appended to the transaction data of the transaction record in the data file. The advantage of serializing the transaction data is that the transaction data and its associated additional data can be subsequently accessed (e.g., multiple times) for creating and evaluating feature candidates efficiently without requiring access to the online database system. Accessing the transaction data (and the additional data) from a flat data structure (e.g., a text file) is faster than accessing the same data from a database system, which requires submission of multiple queries and retrieving data from multiple data structures (e.g., records and/or tables). Furthermore, since the transaction data and the additional data associated with a transaction record are grouped together (e.g., stored in the same row or line), all of the relevant information that may be needed to create and evaluate the candidate features for a transaction record can be accessed by simply reading the data from the same row or line of the data file, without requiring further access to a databases system (e.g., the online database system).

The framework may then provide an interface (e.g., an application programming interface (API)) that enables the data scientist to create, adjust, and/or evaluate candidate features based on the data related to the transaction records in the data file. For example, the API may enable the data scientist to access the different properties of the selected transaction records by making different function calls in software codes. In one example, the data scientist may create a candidate feature corresponding to a difference between the transaction amount of the electronic transaction and an average transaction amount in previous transactions that involve the payor in the electronic transaction by making function calls that access the transaction amount of each selected transaction and the transaction amounts of the past transactions that involve the payor from the data file. Based on the function calls via the API, the framework may provide values corresponding to the candidate feature by performing calculations based on the transaction data and the additional data associated with the selected transaction records stored in the data file. Since accessing the transaction data and/or the additional data from the data file is quick (e.g., relative to accessing a database system), the values can be provided to the data scientist quickly, and the data scientist can manipulate and/or adjust the candidate features more efficiently.

By using the API provided by the framework, the data scientist may manipulate, test, and evaluate feature candidates to determine a set of features to be used in the computer model. Once the set of features and the logic for evaluating risks of electronic transactions are determined, the framework may generate and/or configure a computer model based on the set of features and the logic. The computer model may be a machine learning model that can be trained using a set of training data. Advantageously, the computer model may be generated and/or configured to work with the online database to evaluate risks of live electronic transactions, such that no translation or additional implementation of the computer model by other software developers are needed. In some embodiments, the framework may also validate the computer model (e.g., testing the computer model) by running the computer model over the selected transaction records. For example, the framework may use the computer model to generate a risk score for each of the selected transaction records and compare the risk score against known results (e.g., predetermined risk scores) associated with the selected transaction records.

However, since the generated computer model is configured to work with the online database system, the computer model may ingest data based on the particular data structure associated with the online database system, which is different from the serialized format of the transaction data in the data file. As such, the framework of some embodiments may deserialize the transaction data and the additional data by storing the transaction data and the additional data in database objects (e.g., tables of records, data objects, etc.) according to the data structure of the online database system to mimic the online database system. The framework then runs the computer model through each of the transaction records. For example, the framework may retrieve a first transaction record from the data structure and may derive a set of values corresponding to the set of features based on the transaction data and/or the additional data associated with the first transaction record. The framework may then provide the set of values as input data to the computer model, which may then produce a risk score based on the set of values.

In some instances, the selected transaction records may include a large number of records (e.g., 10 million transaction records). As such, in some embodiments, the framework may perform the testing of the computer model over a distributed system. Another benefit of serializing the data and generating the data file is that the data stored for each transaction record (e.g., the transaction data and the additional data) includes all of the information needed to evaluate a risk of the transaction record by the computer model, and the data of each record can be easily separated from each other, as the data related to each transaction record is stored together (e.g., in a single row or line of the data file). Thus, the framework may easily divide the transaction records into groups of transaction records (e.g., based on the rows or lines of data in the data file). The framework may then distribute the groups of transaction records to multiple computer servers. Each of the computer servers may deserialize its corresponding group of transaction records by storing the transaction data and the additional data of the transaction records in the group in database objects according to the data structure of the online database system. Each computer server may then use the computer model on the transaction records in its corresponding group to generate risk scores for those transaction records. The framework may then compile the risk scores generated by the computer model from the different computer servers and may validate the computer model based on the computed risk scores.

In some embodiments, at least a portion of the framework may be implemented on a device used by the data scientist such that the operations of generating the computer model may be performed on the local device used by the data scientist. For example, the data file may be saved in the memory of the local device and may be accessed by the framework locally (as opposed to retrieving the data over a network). In addition, the deserialized data may also be stored in memory of the local machine when validating the computer model. Performing the operations of generating and validating the computer model by the local device without requiring access to a remote database system further enhances the performance of the framework.

Figure 1:
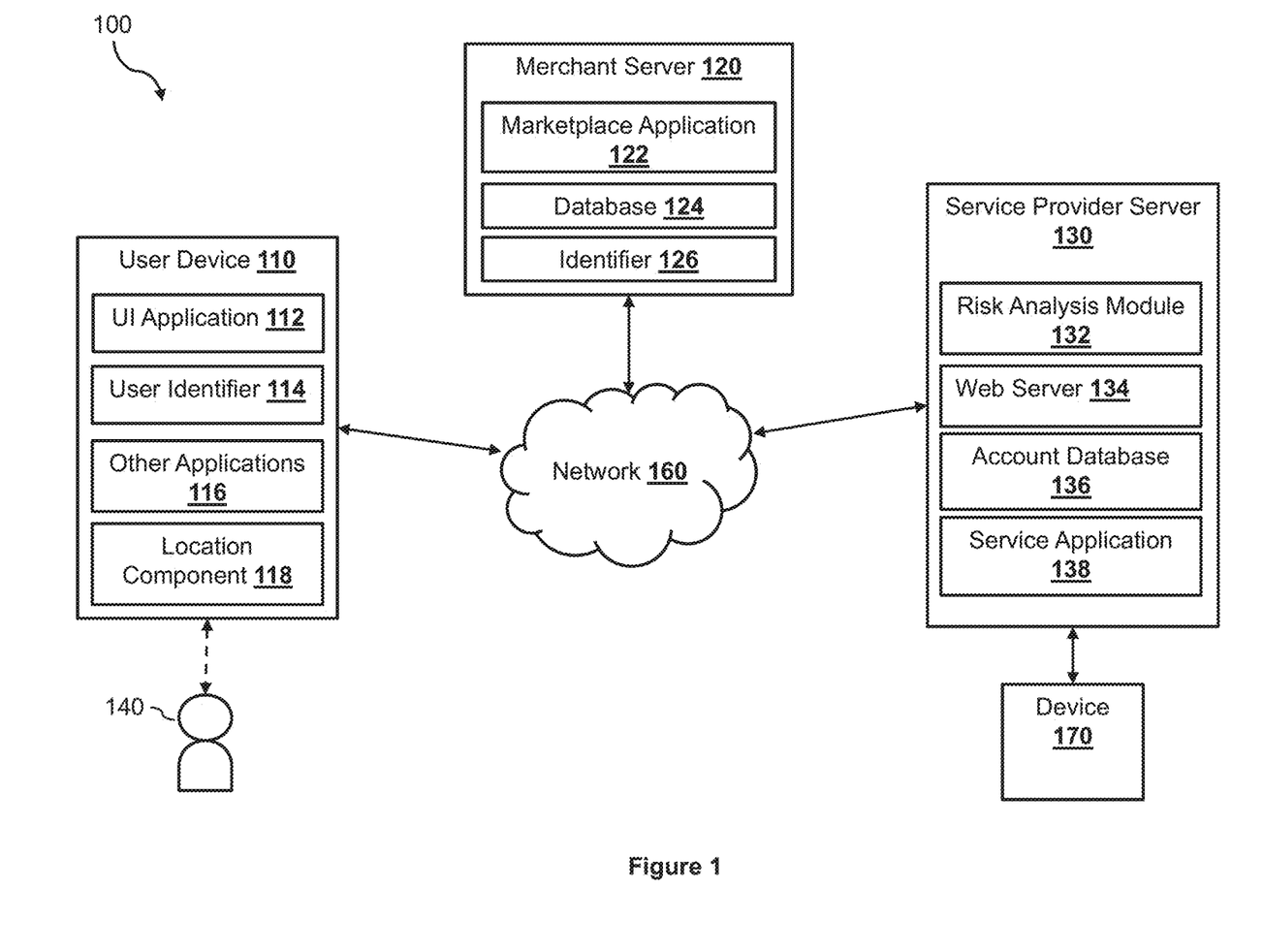
FIG. 1 is a block diagram illustrating an electronic transaction system according to an embodiment of the present disclosure.

FIG. 1 illustrates an electronic transaction system 100 within which the framework may be implemented according to one embodiment of the disclosure. The electronic transaction system 100 includes a service provider server 130 associated with an electronic service provider, a merchant server 120, and a user device 110 that may be communicatively coupled with each other via a network 160. The service provider server 130 may be communicatively coupled with a device 170 directly or via an internal network associated with the electronic service provider. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account with the electronic service provider to conduct account services or conduct electronic transactions (e.g., electronic payment transactions, adding funding source transactions, etc.) with the service provider server 130. Similarly, a merchant associated with the merchant server 120 may use the merchant server 120 to log in to a merchant account with the electronic service provider to conduct account services or conduct electronic transactions (e.g., electronic payment transactions) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile application, etc.), which may be utilized by the user to conduct electronic transactions (e.g., selling, shopping, purchasing, bidding, perform electronic payments, etc.) with the service provider server 130 over the network 160. In one aspect, purchase expenses may be directly and/or automatically debited from an account related to the user via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one user identifier 114, which may be implemented, for example, as operating system registry entries, cookies associated with the user interface application 112, identifiers associated with hardware of the user device 110 (e.g., a media control access (MAC) address), or various other appropriate identifiers. The user identifier 118 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 114 may be passed with a user login request to the service provider server 130 via the network 160, and the user identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, fund transfer request, a request for adding an additional funding source (e.g., a new credit card), or other types of request. The user information may include user identification information.

The user device 110, in various embodiments, include a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of businesses entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as a payment intermediary between customers of the merchant and the merchant itself. For example, the merchant server 120 may use an application programming interface (API) that allows it to offer sale of goods in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 13Q. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an electronic service provider, which may provide electronic services (e.g., selling of merchandise processing, purchasing of merchandise, performing electronic transactions, etc.). As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc. of San Jose, Calif., USA, and/or one or more financial institutions or a respective intermediary that may provide multiple point of sale devices at various locations to facilitate transaction routings between merchants and, for example, financial institutions.

In some embodiments, the service application 138 may include a payment processing application (not shown) for processing purchases and/or payments for financial transactions between a user and a merchant. In one implementation, the payment processing application assists with resolving financial transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to interact with a web browser of the user device 110 by serving web content to users in response to HTTP requests. As such, the web server 134 may include pre-generated web content ready to be served to users. For example, the web server 134 may store a log-in page and is configured to serve the log-in page to users for logging into user accounts of the users to access various service provided by the service provider server 130. The web server 134 may also include other webpages associated with the different electronic services offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts, merchant accounts, and transaction records in an account database 136. As such, the account database may store account information associated with one or more individual users (e.g., the user 140 associated with user device 110) and merchants and transaction data associated with transactions. For example, account information may include private financial information of users and merchants, such as one or more account numbers, passwords, credit card information, banking information, digital wallets used, or other types of financial information. The transaction records may include Internet Protocol (IP) addresses, device information associated with the transaction, transaction dates, transaction amounts, payor identities, payee identities, etc. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

In various embodiments, the service provider server 130 includes a risk analysis module 132 that is configured to determine whether to authorize or deny an incoming request from the user device 110 or from the merchant server 120. The request may be a log-in request, an electronic payment request, a request for adding an additional funding source, an onboarding request, or other types of requests associated with the variety of electronic services offered by the service provider server 130. As such, when a new request is received at the service provider server 130 (e.g., by the web server 134), the risk analysis module 132 may analyze the request (e.g., based on information stored in the accounts database 136) and determine whether to authorize of deny the request. The risk analysis module 132 may transmit an indication of whether to authorize or deny the request to the web server 134 and/or the service application 138 such that the web server 134 and/or the service application 138 may process the request based on the indication.

Figure 2:
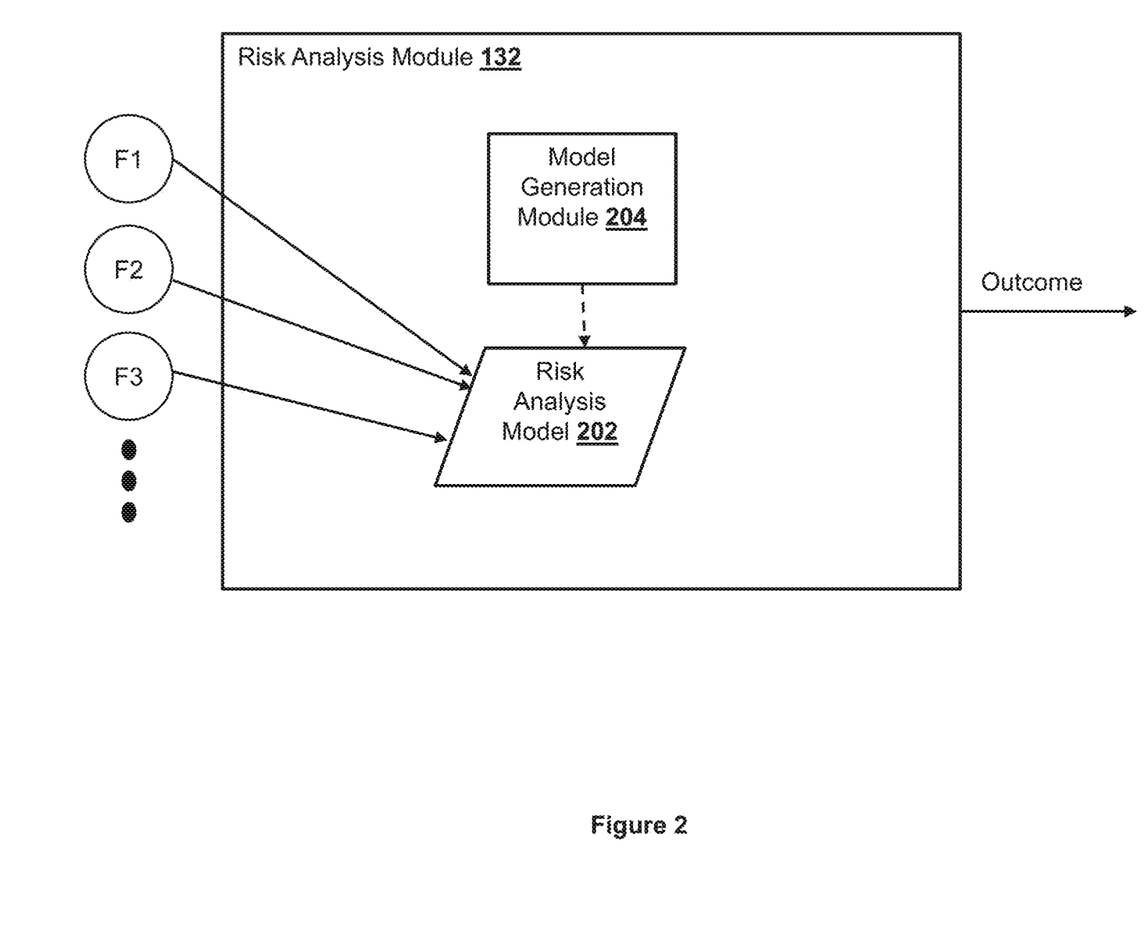
FIG. 2 is a block diagram illustrating a risk analysis module according to an embodiment of the present disclosure.

FIG. 2 illustrates a block diagram of the risk analysis module 132 according to an embodiment of the disclosure. The risk analysis module 132 includes a model generation module 204 for generating a risk analysis model 202. The risk analysis model 202 is a computer model that receives data related to an electronic transaction request, such as a log-in request, an electronic fund transfer (e.g., payment) request, or a request for adding an additional funding source to a user account, etc., analyzes the data, and produces an outcome (e.g., a risk score) for the request based on a determination of whether the request maybe a fraudulent request. The data that the risk analysis model 202 receives may correspond to a set of features (e.g., the features F1, F2, F3, etc.) determined to be used by the risk analysis model 202.

As discussed above, malicious users often use different fraud tactics to perform unauthorized transactions (e.g., by performing an electronic transaction using an account of another user without authorization, etc.). For example, malicious users may use a phishing technique or a man-in-the-middle attack to obtain user credentials associated with a user account. Typically, a transaction request initiated by a malicious user (an unauthorized user) may offer clues that the request is not generated by an authorized user. For example, the transaction request initiated by the unauthorized user usually has characteristics that are different from the characteristics of past transaction requests generated by the legitimate users. The characteristics may include a location from which the request is generated (e.g., indicated by an IP address of a device that initiated the request), a device type used to initiate the request, a browser type used to initiate the request, etc. Furthermore, due to the fact that the malicious user may not have obtained all of the user credentials, the malicious user may fail a login attempt several times before "guessing" the correct user credentials. As such, the number of times that a failed login attempt has occurred in a period of time may indicate that the request is a fraudulent request. The malicious user may also behave differently from the legitimate user. As such, any behavior that deviates from an account's "normal" behavior (e.g., a transaction amount that differs from an average transaction amount by a threshold amount, etc.) may also indicate that the transaction request may correspond to a fraudulent transaction request.

As such, the risk analysis model 202 may obtain data (e.g., features) related to an electronic transaction request, which may include an IP address of a source device, a device type of the source device, a number of successful transactions conducted for the user account within a period of time, a number of failed transactions using the user account attempted within a period of time, a current time, a browser type of a browser used to generate the request, an amount associated with the request, a transaction type of the request, an average transaction amount associated with the payor/payee over a predetermined period of time, and other information related to the request. In some embodiments, the risk analysis model 202 is trained or configured to predict whether a request is a possible fraudulent request based on the received data. As such, the outcome produced by the risk analysis model 202 may be a binary outcome that is either a possible fraudulent request or a legitimate request. In some embodiments, the outcome may be a score (e.g., a risk score) indicating a likelihood that the transaction request is a fraudulent request. The risk analysis module 132 may then provide an indication of the outcome generated by the risk analysis model 202 to other modules or servers within the service provider server 130, such as the web server 134 and/or the service application 138, such that the other modules may process the transaction request accordingly.

Figure 3:
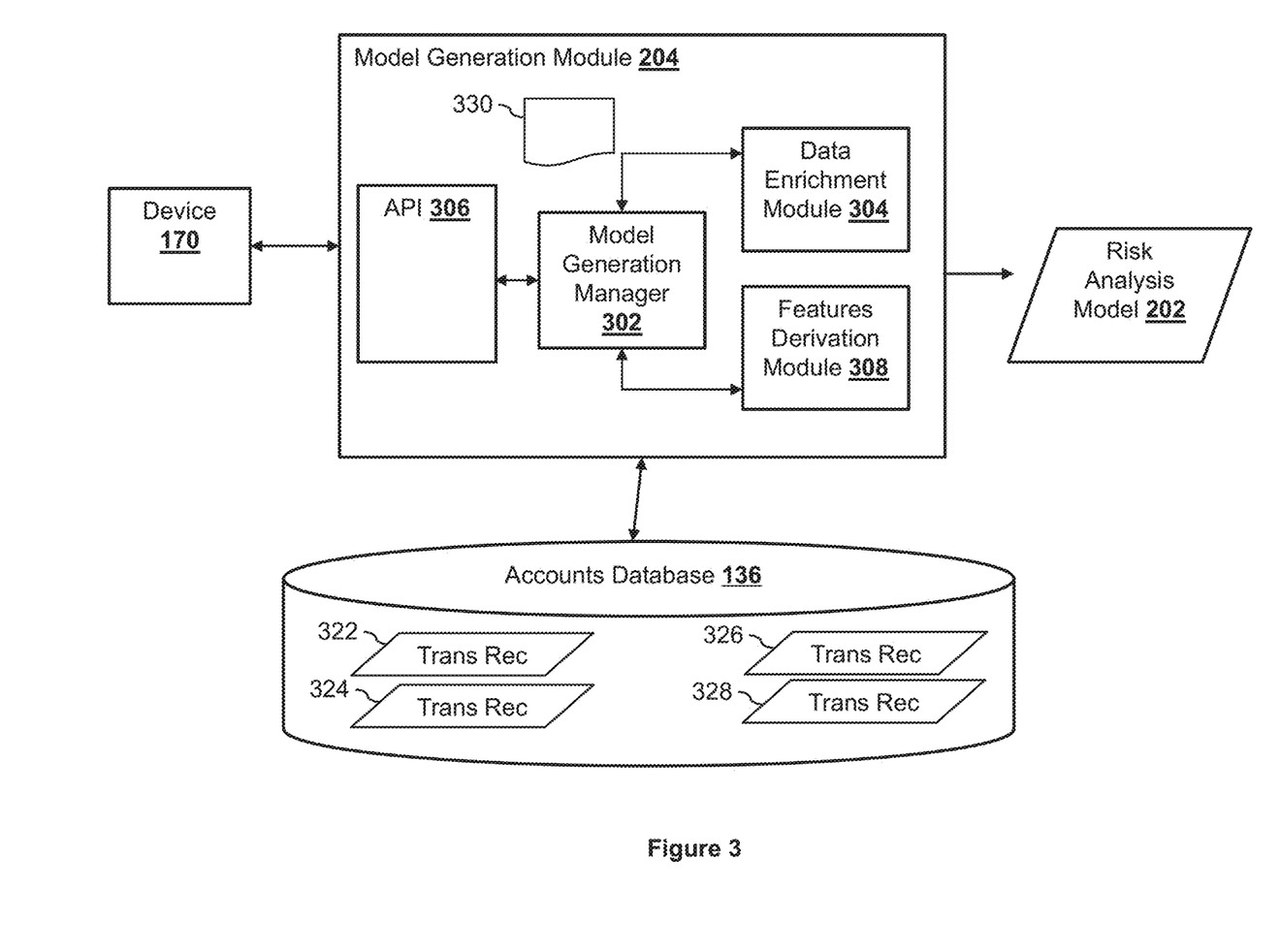
FIG. 3 is a block diagram illustrating a model generation module according to an embodiment of the present disclosure.

FIG. 3 illustrates a block diagram of the model generation module 204 according to an embodiment of the disclosure. The model generation module 204 includes a model generation manager 302 configured to retrieve transaction records from an online database, such as the accounts database 136, a data enrichment module 304 configured to enrich the transaction data in each of the retrieved transaction records with additional data obtained from at least one other transaction record in the accounts database 136, an application programming interface (API) 306 provided to enable a user (e.g., a data scientist) to create, adjust, and evaluate candidate features based on the retrieved transaction data and the additional data, and a features derivation module 306 configured to derive a set of features from the candidate features for use in a risk analysis model (e.g., the risk analysis model 202).

Figure 4:
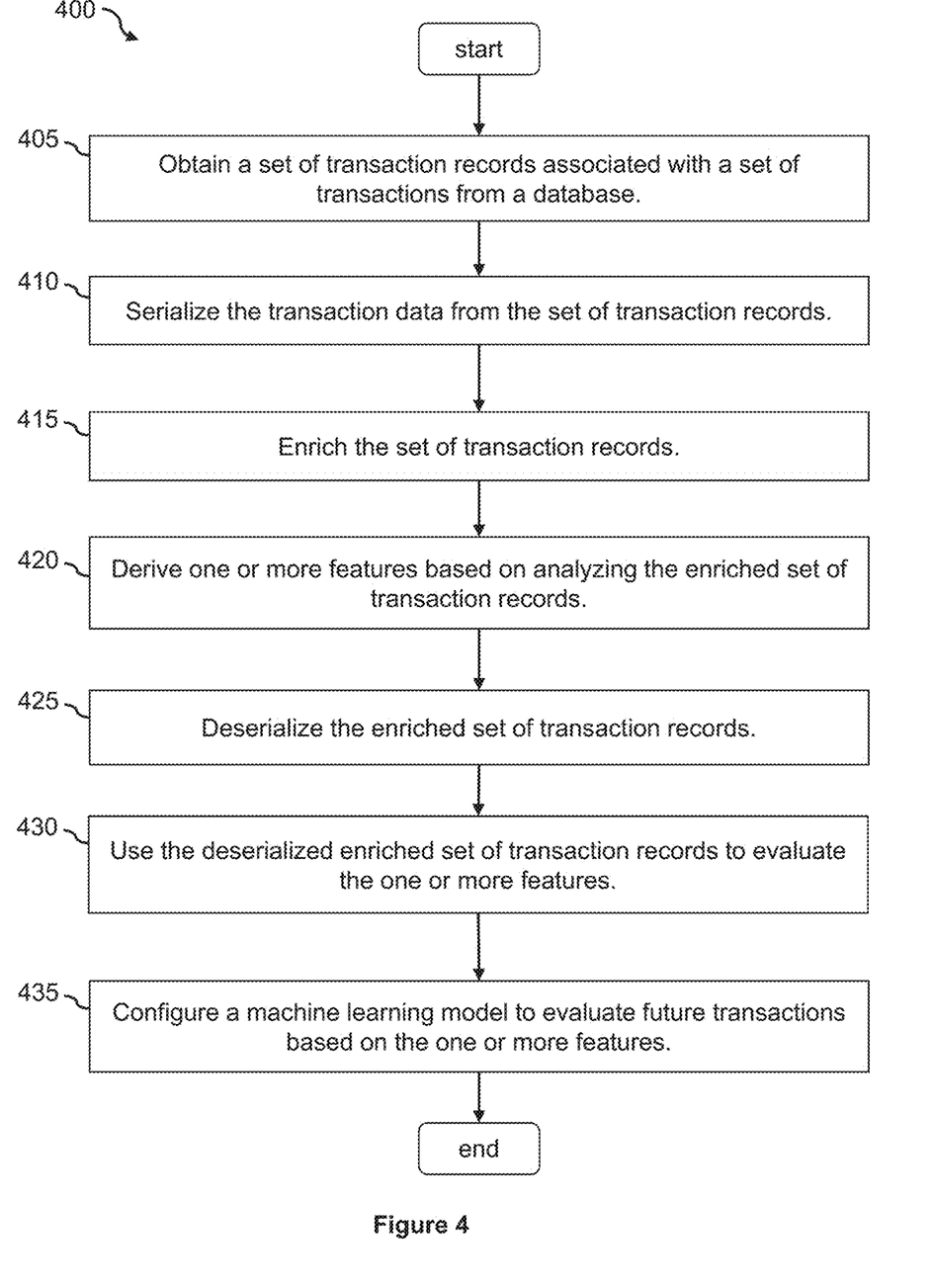
FIG. 4 is a flowchart showing a process of generating a risk analysis model according to an embodiment of the present disclosure.

FIG. 4 illustrates a process 400 for generating a risk analysis model according to an embodiment of the disclosure. In some embodiments, the process 400 may be performed by the model generation module 204. The process 400 begins by obtaining (at step 405) a set of transaction records associated with a set of transaction from a database. For example, the model generation manager 302 may determine a set of criteria for selecting transaction records from the accounts database 136. In some embodiments the model generation manager 302 may provide an interface to a user of the device 170 to enable the user to select one or more of the criteria (e.g., a transaction type). For example, the user may indicate to the model generation manager 302 one or more transaction types, such as an electronic payment transaction type, a login transaction type, an onboarding transaction type, an adding a funding source transaction type, etc. Once the model generation manager 302 determines the set of criteria, the model generation manager 302 may retrieve transaction records (e.g., transaction records 322-328) that satisfy the set of criteria from the accounts database 136. In some embodiments, the model generation manager 302 may generate a database query (e.g., a Structured Query Language (SQL) query) based on the set of criteria and may execute the query against the accounts database 136. In response to executing the query, the accounts database 136 may provide to the model generation manager 302 transaction records that satisfy the set of criteria. For example, if the set of criteria indicates an electronic payment transaction type, each of the retrieved transaction records may include transaction data (e.g., a transaction date, a transaction amount, a payor identifier, a payee identifier, a transaction location, etc.) associated with an electronic payment transaction.

The process 400 then serializes (at step 410) the transaction data from the set of transaction records. As discussed herein, the transaction data of the transaction records may be stored in the accounts database according to a predetermined data structure. For example, the transaction data of each transaction records may be stored in different tables, in different databases (e.g., in a relational database system), in different inter-linked data objects, etc. In some embodiments, upon receiving the transaction records (e.g., the transaction records 322-328), the model generation manager 302 may serialize (e.g., flatten) the transaction records by extracting the transaction data from the particular data structure and serializing the transaction data into a string of characters (e.g., a text format), where each piece of transaction data may be separated by another piece of transaction data using a special character (e.g., a comma, etc.). In some embodiments, the serialized transaction data may be stored in a data file (e.g., a text file) such that the transaction data of each transaction record may occupy a single row (e.g., a single line) in the data file. The different transaction records may be separated by another special character (e.g., a carriage return) in the data file 330. The flattened (e.g., serialized) transaction data enables the model generation module 204 to access the transaction data in the data file 330 faster than accessing the transaction data from the accounts database 136.

The process 400 enriches (at step 415) the set of transaction records. For example, the data enrichment module 304 may enrich the transaction data of each transaction record with additional data obtained from one or more other transaction records from the accounts database 136. The additional data may include data that is needed for deriving one or more features for the transaction record and may comprise transaction data from another transaction record. In some embodiments, for each transaction record, the data enrichment module 304 may extract one or more attributes from the transaction data associated with the transaction record and may obtain additional data from one or more other transaction records based on the extracted attributes. For example, when the transaction records correspond to electronic payment transactions, the data enrichment module 304 may extract the payor identifier and the payee identifier from each transaction record. The data enrichment module 304 may then retrieve transaction data of past transactions that involve the same payor and/or payee. Thus, the data enrichment module 304 may generate a query (e.g., an SQL query) to retrieve transaction data of transaction records (e.g., transaction amounts, transaction dates, etc.) based on the payor identifier and/or the payee identifier extracted from the transaction record, as additional data for the transaction record. The data enrichment module 304 may perform the same process of extracting attributes and retrieving additional data for each of the transaction records in the data file. Upon obtaining the transaction data (e.g., the additional data) of other transaction records from the accounts database 136, the data enrichment module 304 may add the additional data to the transaction data of the transaction record stored in the data file 330. For example, the data enrichment module 304 may append the additional data associated with each transaction record in the end of the transaction data of the transaction record in the data file 330. Thus, each row (or line) in the data file 330 may include transaction data and also additional data associated with the transaction record. The different additional data may also be separated by the special character (e.g., a common). This way, all of the information that may be needed to calculate input values (corresponding to the features) for a risk analysis model for a transaction record can be obtained in the same row (or line) of the data file 330.

After enriching the transaction records, the process 400 derives (at step 420) one or more features based on analyzing the enriched set of transaction records. In some embodiments, the model generation module 204 may provide the API 306 that enable a user of the device 170 to access various data in the data file 330 to create, adjust, and/or evaluate various candidate features. For example, the API 306 may enable the user of the device 170 to access different data based on the data types (e.g., a transaction date, a transaction amount, a payor identifier, etc.) so that the user of the device 170 is not required to know the data structure of the data file 330. Furthermore, based on requests submitted through the API 306, the model generation module 204 may also calculate one or more values corresponding to a particular feature based on the transaction data and/or the additional data associated with a transaction record. For example, the user of the device 170 may submit, via the API 306, a request to generate a feature (e.g., a feature candidate) corresponding to a difference between the transaction amount of the electronic transaction and an average transaction amount in previous transactions that involve the payor and/or the payee in the electronic transaction. Based on the request, the features derivation module 308 may access different transaction data associated with each transaction record (e.g., accessing the transaction amount of the transaction record and the transaction amounts of previous transactions associated with the payor and/or the payee). The features derivation module 308 may then calculate, for each transaction record, a value corresponding to the feature candidate by performing calculation on some of the transaction data associated with the transaction record. The model generation module 204 may then provide the calculated values to the user via the device 170.

By using the API 306, the user of the device 170 may create different candidate features, adjust the candidate features, and evaluate the candidate features (e.g., by reviewing the calculated values corresponding to the features and determining how indicative the features are to the risk of a transaction record). Once the user determines a final set of features (e.g., an IP address of the device that initiates the transaction, a transaction amount, a browser type used to initiate the transaction, a difference between the transaction amount of the electronic transaction and an average transaction amount in previous transactions that involve the payor in the electronic transaction, etc.) to be used in the risk analysis model 202, the model generation manager 302 may generate or configure the risk analysis model 202 based on the set of features. For example, the model generation manager 302 may generate or configure the risk analysis model 202 such that the risk analysis model 202 ingests input data corresponding to the set of features associated with a transaction request, and produce an outcome (e.g., a risk score) indicating a risk of the transaction request.

Figure 5:
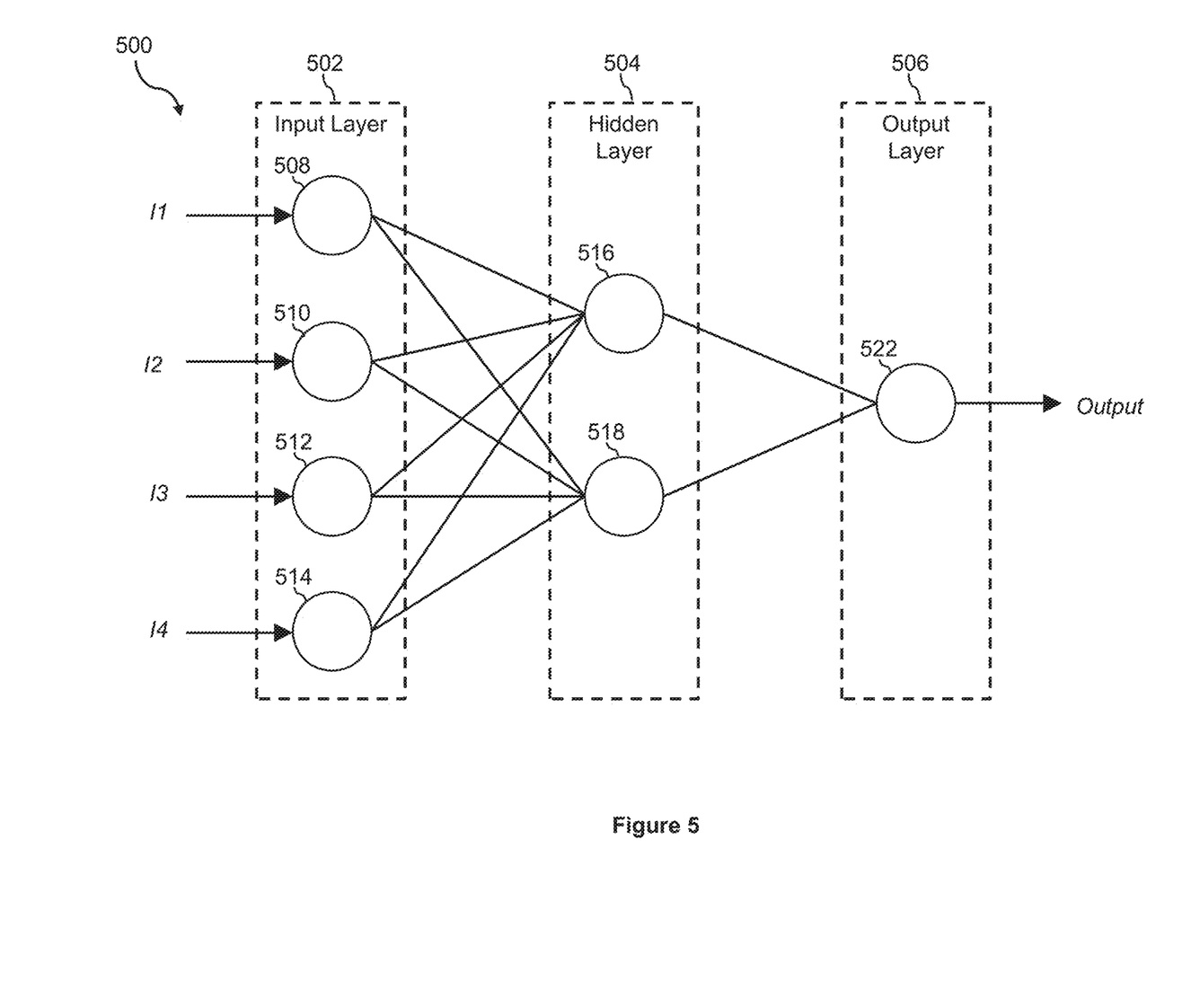
FIG. 5 illustrates an exemplary implementation of a risk analysis model according to an embodiment of the present disclosure.

FIG. 5 illustrates an example implementation of the risk analysis model 202. In this example, the risk analysis model 202 is implemented as an artificial neural network 500 for evaluating risks of electronic transaction requests. As shown, the artificial neural network 500 includes three layers—an input layer 502, a hidden layer 504, and an output layer 506. Each of the layers 502, 504, and 506 may include one or more nodes. For example, the input layer 502 includes nodes 508-514, the hidden layer 504 includes nodes 516-518, and the output layer 506 includes a node 522. In this example, each node in a layer is connected to every node in an adjacent layer. For example, the node 508 in the input layer 502 is connected to both of the nodes 516 and 518 in the hidden layer 504. Similarly, the node 516 in the hidden layer is connected to all of the nodes 508-514 in the input layer 502 and the node 522 in the output layer 506. Although only one hidden layer is shown for the artificial neural network 500, it has been contemplated that the artificial neural network 500 generated or configured by the model generation module 204 may include as many hidden layers as necessary.

In this example, the artificial neural network 500 is configured to receive a set of input values (e.g., I1, I2, I3, I4, etc.) corresponding to the set of features and produce an output value. Each node in the input layer 502 may correspond to a distinct input value. As such, the model generation module 204 may configure nodes 508-514 in the input layer 502 of the artificial neural network 500 to correspond to the set of features derived by the features derivation module 308. For example, the node 508 may correspond to the feature of an IP address of the device that initiates the transaction, the node 710 may correspond to the feature of a transaction amount, the node 712 may correspond to the feature of a browser type used to initiate the transaction, and the node 714 may correspond to the feature of a difference between the transaction amount of the electronic transaction and an average transaction amount in previous transactions that involve the payor in the electronic transaction.

Although only four input nodes are shown to be included in the artificial neural network 500, the model generation module 204 may generate or configure the risk analysis model 202 to include more (or less) input nodes based on the number of features determined by the features derivation module 308. In some embodiments, each of the nodes 516-518 in the hidden layer 504 generates a representation, which may include a mathematical computation (or algorithm) that produces a value based on the input values received from the nodes 508-514. The mathematical computation may include assigning different weights to each of the data values received from the nodes 508-514. The nodes 516 and 518 may include different algorithms and/or different weights assigned to the data variables from the nodes 508-514 such that the nodes 516-518 may produce different values based on the same input values received from the nodes 508-514. In some embodiments, the weights that are initially assigned to each of the nodes 516 and 518 may be randomly generated (e.g., using a computer randomizer). The values generated by the nodes 516 and 518 may be used by the node 522 in the output layer 506 to produce an output value for the artificial neural network 500. In some embodiments, the output value produced by the artificial neural network 500 may indicate a likelihood that the electronic transaction request corresponds to a fraudulent transaction request.

The artificial neural network 700 may be trained by using historical electronic transaction data (training data). The historical electronic transaction data may include transaction records for different time periods in the past (e.g., July 2016 through March 2017, July 2015 through March 2016, July 2014 through March 2015, etc.). By providing the training data to the artificial neural network 500, the nodes 516 and 518 in the hidden layer 504 may be trained (adjusted) such that an optimal output (a likelihood of the electronic transaction request corresponds to a fraudulent transaction request) is produced in the output layer 506 based on the training data. By continuously providing different sets of training data and penalizing the artificial neural network 500 when the output is incorrect, the artificial neural network 500 (and specifically, the representations of the nodes in the hidden layer 504) may be trained (adjusted) to improve its performance in detecting fraudulent electronic transaction requests over time. Adjusting the artificial neural network 500 may include adjusting the weights associated with each node in the hidden layer 504.

Referring back to FIG. 4, the process 400 then deserializes (at step 425) the enriched set of transaction records and uses (at step 430) the deserialized enriched set of transaction records to evaluate the one or more features. For example, the model generation module 204 may validate (e.g., test) the risk analysis model 202 using the transaction records retrieved from the accounts database 136 to determine that the performance (e.g., accuracy of detecting fraudulent transaction requests) is above a predetermined threshold. As discussed herein, one benefit of using the framework to generate a risk analysis model is that the generated model can be incorporated into the online system seamlessly without requiring translation from one implementation to another implementation (e.g., changing software codes). As such, the generated risk analysis model 202 may be configured to ingest input data according to the particular data structure associated with the online system (e.g., the same data structure as the one of the accounts database 136), which is different from the data structure of the data file 330 (which may be a flat data structure or without a data structure). Thus, in order for the risk analysis model 202 to ingest transaction data associated with the transaction records, the model generation manager 302 may deserialize the transaction data in the data file 330 by generating a data structure (e.g., in the random access memory (RAM) of a device) that mimics the particular data structure of the accounts database 136 and inserting the transaction data from the data file 330 to the generated data structure. In some embodiments, even though the transaction data is formatted (e.g., arranged) according to the particular data structure, the transaction data remains in the RAM of a device (as opposed to be stored in an actual database system), the transaction data can be accessed relatively fast. This way, the risk analysis model 202 may access the transaction data from the data structure as if it is accessing the accounts database 136, but without requiring access to an actual database system. Thus, the risk analysis model 202 may be used to evaluate the transaction records by accessing the transaction data in the deserialized format, calculating the input values corresponding to the features determined at the step 420 based on the transaction data, and generating outputs based on the input values without accessing a database system. The generated outputs (e.g., a risk score, an indication of whether the transaction request corresponds to a fraudulent request, etc.) may be compared against known results of whether the transactions correspond to fraudulent transactions in order to validate the risk analysis model 202.

At step 435, the process 400 configures a machine learning model to evaluate future transactions based on the derived one or more features. For example, after validating the risk analysis module 202, the model generation module 204 may transmit the risk analysis model 202 to the service provider server 130 to be used by the risk analysis module 132 to evaluate incoming transaction requests (e.g., requests from the user device 110 and/or the merchant server 120) based on the set of features determined by the model generation module 204.

In some embodiments, the model generation module 204 may be implemented within the service provider server 130, and a user of the device 170 may access the functionalities of the model generation module 204 (e.g., to create/evaluate features, to generate/configure a risk analysis model) by connecting to the service provider server 130, such that the majority of the operations of the model generation module 204 is performed at the service provider server 130. Alternatively, at least a portion of the model generation module 204 may be implemented within the device 170 such that the operations of generating the computer model may be performed on the local device used by the data scientist. Advantageously, after retrieving the transaction data and the additional data from the accounts database 136, the transaction data and the additional data (e.g., in the serialized format stored in the datafile 330) may be stored in the local device (e.g., the device 170) and accessed by the model generation module 204 locally (without accessing data from a remote device). In addition, the deserialized data may also be stored in memory of the local machine when validating the computer model. Performing the operations of generating and validating the computer model by the local device without requiring access to a remote database system further enhances the performance of the framework.

Figure 6:
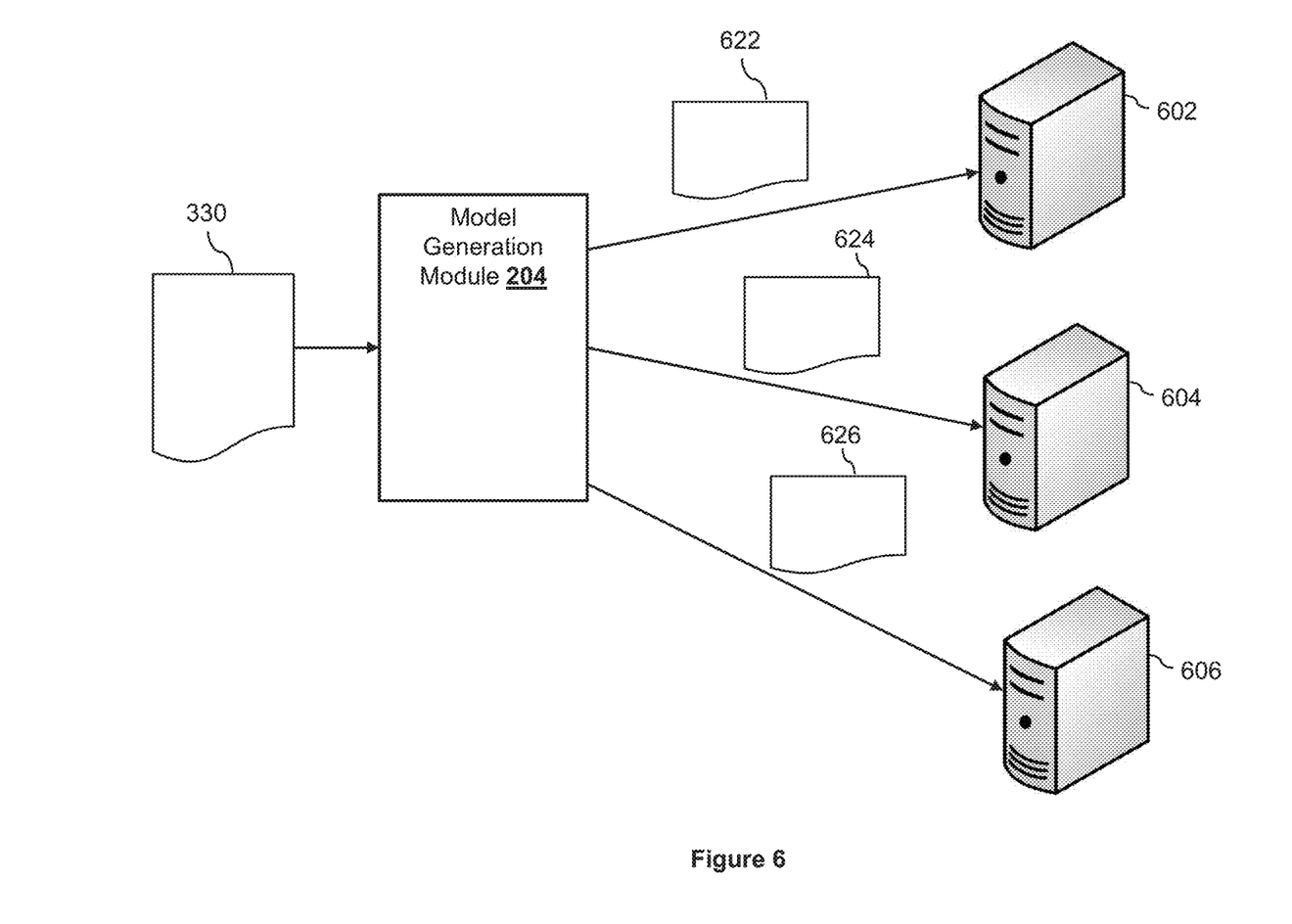
FIG. 6 illustrates validating of a risk analysis model by multiple devices in parallel according to an embodiment of the present disclosure.

Furthermore, since the transaction data and the additional data of each of the transaction records are stored in the serialized format, the information needed to evaluate the different transaction records can be easily separated from each other. Thus, the model generation manager 302 may divide the data associated with the transaction records in the data file 330 into multiple groups of transaction records. One of the benefits of dividing the data associated with the transaction records into multiple groups is that the validation of the risk analysis model 202 can be sped up by using multiple devices (e.g., multiple servers) to validate the risk analysis model 202 in parallel. For example, as shown in FIG. 6, the model generation module 204 may divide the data associated with the transaction records in the data file 330 into multiple data files (e.g., data files 622-626), where each data file includes a different group of transaction records (e.g., the transaction data and the additional data associated with the group of transaction records). The model generation module 204 may then transmit data files 622-626 to devices 602-606), respectively. For example, the model generation module 204 may transmit the data file 622 storing the transaction data and the additional data associated with a first group of transaction records to the device 602. The model generation module 204 may transmit the data file 624 storing the transaction data and the additional data associated with a second group of transaction records to the device 604. The model generation module 204 may transmit the data file 626 storing the transaction data and the additional data associated with a third group of transaction records to the device 606. The model generation module 204 may also transmit the risk analysis module 202 to each of the devices 602-606, such that each of the devices 602-606 may validate the risk analysis model 202 using a corresponding data file. Since the validation of the risk analysis model 202 may be performed in parallel across the multiple devices, the validation may be completed much faster than if it were performed by a single device. In some embodiments, each of the devices 602-606 may compare the outputs generated by the risk analysis model 202 against the known results, and then provide a summary (e.g., a report of the comparison)

back to the model generation module 204. In some other embodiments, the devices 602-606 may simply transmit the outputs of the risk analysis model 202 back to the model generation module 204, and the model generation module 204 may validate the risk analysis model 202 by comparing the outputs against the known results.

Thus, by using the framework as disclosed herein, risk analysis models can be generated faster than using conventional methods, such that updated risk analysis models can be implemented in the online system with a shorter turn-around time to provide better performance in evaluating risks of transaction requests.

Figure 7:
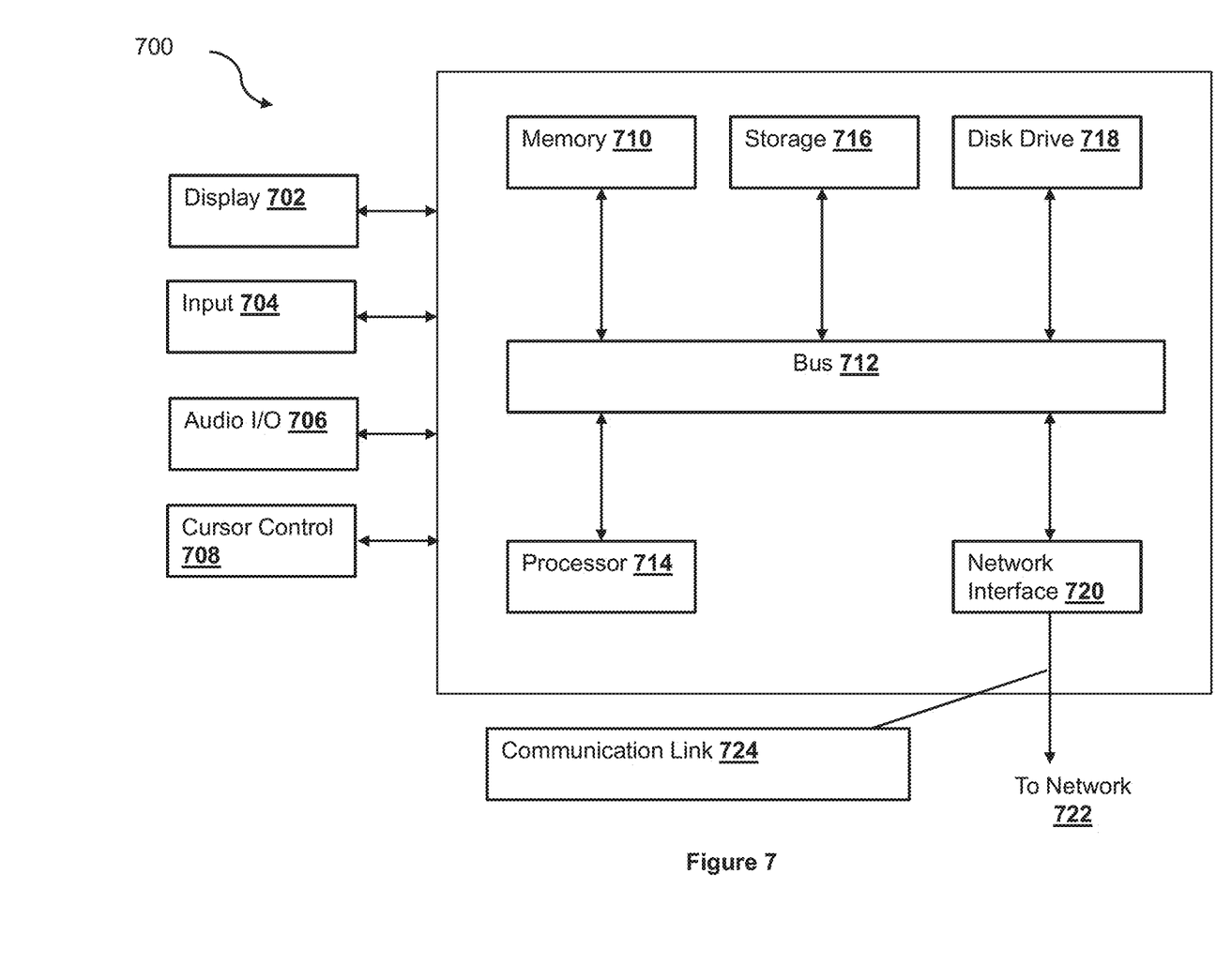
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, the user device 110, and the device 170. In various implementations, each of the user device 110 and the device 170 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, 130, and 170 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 900 or transmission to other devices via a communication link 724. The processor 914 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid state drive, a hard drive). The computer system 700 performs specific operations by the processor 714 and other components by executing one or more sequences of instructions contained in the system memory component 710. For example, the processor 714 can perform the risk analysis model generation functionalities described herein according to the process 400.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A device, comprising:
a non-transitory memory; and
one or more hardware processors coupled with the non-transitory memory and configured to read instructions from the non-transitory memory to cause the device to perform operations comprising:
obtaining, from a remote database system, a set of transaction records associated with a set of transactions;
retrieving, for each particular transaction record in the set of transaction records from the remote database system, additional transaction data associated with at least one other transaction record having a common attribute with the particular transaction record;
generating, based on the additional transaction data, an enriched set of transaction records;
serializing the enriched set of transaction records;
without further accessing the remote database system:
evaluating a plurality of features for performing risk assessment on transactions based on the serialized enriched set of transaction records, and wherein at least one of the plurality of features is derived from at least a portion of the additional transaction data;
selecting, from the plurality of features, a subset of features for performing risk assessment based on the evaluating;
configuring a machine learning model to evaluate transaction requests based on the selected subset of features;
deserializing the serialized enriched set of transaction records; and
training the machine learning model using the deserialized enriched set of transaction records; and
evaluating a transaction request using the trained machine learning model.

2. The device of claim 1, wherein the operations further comprise:
receiving a selection of a first transaction type, from a plurality of transaction types, from a user; and
determining the set of transactions from a plurality of transactions based on the first transaction type.

3. The device of claim 1, wherein the set of transaction records are stored in the remote database system according to a first data structure, wherein the operations further comprise:
storing the serialized enriched set of transaction records on the device according to a second data structure.

4. The device of claim 3, wherein the machine learning model is configured to ingest transaction data according to the first data structure, and wherein the operations further comprise:
storing the deserialized enriched set of transaction records on the device according to the first data structure; and
validating the machine learning model based on the deserialized enriched set of transaction records.

5. The device of claim 4, wherein the serialized enriched set of transaction records is deserialized in a local memory of the device without accessing the remote database system.

6. The device of claim 1, wherein the evaluating the plurality of features comprises providing an interface for a user to manipulate transaction data in the enriched set of transaction records.

7. The device of claim 1, wherein the evaluating the plurality of features comprises:
calculating, for each particular feature in the plurality of features, a value based on at least a portion of transaction data associated with a transaction record in the enriched set of transaction records; and
determining whether the value is indicative for evaluating a transaction associated with the transaction record.

8. The device of claim 1, wherein the set of transaction records comprises a first transaction record associated with a first transaction, wherein the first transaction record comprises information associated with a first user who is a payor in the first transaction, and wherein the generating the enriched set of transaction records comprises retrieving, for the first transaction record, transaction data associated with a second transaction record associated with a second transaction in which the first user is also a payor.

9. The device of claim 1, wherein the operations further comprise evaluating the set of transaction records using the subset of features.

10. The device of claim 9, wherein the evaluating the set of transaction records using the subset of features comprises:
dividing the serialized enriched set of transaction records into a plurality of groups of transaction records;
transmitting the plurality of groups of transaction records to a plurality of servers, respectively; and
causing each server in the plurality of servers to evaluate the subset of features by running the machine learning model on the corresponding group of transaction records.

11. A method comprising:
obtaining, from a remote database system, a set of transaction records associated with a set of transactions;
retrieving, for each particular transaction record in the set of transaction records from the remote database system, additional transaction data associated with at least one other transaction record having a common attribute with the particular transaction record;
generating an enriched set of transaction records based on the additional transaction data;
serializing the enriched set of transaction records to generate serialized transaction records;
providing an application programming interface (API) for evaluating a plurality of features based on analyzing the serialized transaction records;
selecting, from the plurality of features, a subset of features based on the evaluating;
configuring a machine learning model to evaluate transaction requests based on the selected subset of features;
deserializing the serialized transaction records;
training the machine learning model using the deserialized transaction records; and
predicting, using the trained machine learning model, a risk of a transaction request.

12. The method of claim 11, further comprising validating the machine learning model.

13. The method of claim 12, wherein the validating the machine learning model comprises:
dividing the serialized transaction records into a plurality of groups of serialized transaction records, wherein each group of serialized transaction records includes transaction data and additional data associated with a subset of the set of transaction records;
transmitting the plurality of groups of serialized transaction records to a plurality of servers, respectively; and causing each server in the plurality of servers to use the machine learning model to evaluate the corresponding subset of the set of transaction records based on the derived set of features.

14. The method of claim 11, further comprising:
receiving a selection of a first transaction type, from a plurality of transaction types, from a user; and
determining the set of transactions from a plurality of transactions based on the first transaction type.

15. The method of claim 11, further comprising:
receiving, via the API, a definition of a feature;
retrieving transaction data and additional data associated with a first transaction record from the serialized transaction records;
calculating a value corresponding to the feature based on at least a portion of the transaction data and the additional data associated with the first transaction record; and
presenting the value on a device.

16. The method of claim 11, wherein the evaluating the plurality of features, the selecting the subset of features, and the configuring the machine learning model are performed without accessing the remote database system.

17. A non-transitory machine-readable medium having stored thereon machine-readable instructions executable to cause a machine to perform operations comprising:
obtaining, from a remote database system, a set of transaction records associated with a set of transactions;
retrieving, for each particular transaction record in the set of transaction records from the remote database system, additional transaction data associated with at least one other transaction record having a common attribute with the particular transaction record;
generating an enriched set of transaction records based on the additional transaction data;
serializing the enriched set of transaction records;
without further accessing the remote database system:
evaluating a plurality of features for risk assessment on transactions based on the serialized enriched set of transaction records, wherein at least one of the plurality of features is derived based on at least a portion of the additional transaction data;
selecting, from the plurality of features, a subset of features for performing risk assessment based on the evaluating;
configuring a machine learning model to evaluate transaction requests based on the subset of features;
deserializing the serialized enriched set of transaction records; and
training the machine learning model using the deserialized enriched set of transaction records; and
evaluating a transaction request using the trained machine learning model.

18. The non-transitory machine-readable medium of claim 17, wherein the operations further comprise:
receiving a selection of a first transaction type, from a plurality of transaction types, from a user; and
determining the set of transactions from a plurality of transactions based on the first transaction type.

19. The non-transitory machine-readable medium of claim 17, wherein the set of transaction records are stored in the remote database system according to a first data structure, wherein the operations further comprise:
storing the serialized enriched set of transaction records on a device external to the remote database system according to a second data structure.

20. The non-transitory machine-readable medium of claim 19, wherein the first data structure is a flat data structure, and wherein the second data structure is a hierarchical data structure.

* * * * *